(12) United States Patent
Wolf

(10) Patent No.: US 8,372,345 B2
(45) Date of Patent: Feb. 12, 2013

(54) INTEGRATED OZONE GENERATOR SYSTEM

(76) Inventor: Wayne Wolf, Austin, TX (US)

( * ) Notice: Subject to any disclaimer, the term of this patent is extended or adjusted under 35 U.S.C. 154(b) by 0 days.

(21) Appl. No.: 12/806,778

(22) Filed: Aug. 20, 2010

(65) Prior Publication Data

US 2011/0268621 A1    Nov. 3, 2011

Related U.S. Application Data

(60) Provisional application No. 61/274,815, filed on Aug. 21, 2009.

(51) Int. Cl.
*B01J 19/08* (2006.01)
(52) U.S. Cl. ......... 422/186.07; 422/186.03; 422/186.04; 422/186.11; 204/164
(58) Field of Classification Search ............. 422/186.07, 422/186.03, 186.04, 186.11; 204/164
See application file for complete search history.

(56) References Cited

FOREIGN PATENT DOCUMENTS

GB      2250407    *   1/1990

* cited by examiner

*Primary Examiner* — Xiuyu Tai
(74) *Attorney, Agent, or Firm* — Matheson Keys Garsson & Kordzik PLLC

(57) ABSTRACT

An ozone generating apparatus includes a base container for holding water, and a head assembly connected to the upper edge of the base container, the head assembly containing a plurality of ozone generating cells each having a dielectric tube and an electrode assembly coaxially disposed within the associated dielectric tube. The dielectric tubes and electrode assemblies are disposed and connected such that the tube and/or electrode assembly of each ozone generating cell can be accessed independently of all other ozone generating cells, and such that the possibility of cascade failure of all remaining ozone generating cells upon failure of a single cell is substantially eliminated. The base container is provided with a process back flood prevention structure to protect the ozone generating cells.

6 Claims, 5 Drawing Sheets

INTEGRATED OZONE GENERATOR SYSTEM

RELATED APPLICATION DATA

This application claims the benefit of U.S. Provisional Patent Application Ser. No. 61/274,815, filed Aug. 21, 2009, by the same inventor/applicant, and under the same title.

FIELD OF THE INVENTION

The present invention generally relates to systems for generating and dispensing ozone, and in its preferred embodiments more specification relates to improvements in the physical design of ozone generating systems for producing ozone in a corona discharge field, and to functional improvements in such systems.

BACKGROUND

It has long been known that ozone is a very powerful oxidizer, and ozone is employed in a variety of processes for a variety of purposes. One of the most significant of those purposes is treatment of water, both in processes for production of potable water and in processes for the treatment of waste water. Ozone is effective as a water treatment agent for the reduction of BOD and COD, VOC's, and bacterial and viral pathogens, and is also beneficial in the removal of small particles and metal compounds. For a variety of reasons, including the fact that ozone can be efficiently generated at the treatment site, requiring only electricity and dry air, it is rapidly becoming the preferred water treatment agent for use at remote sites and/or in undeveloped regions. Ozone is also increasingly being used in established treatment facilities as a replacement for chlorine.

The majority of the ozone used in water treatment facilities is generated in what are referred to as corona discharge generators, in which dry oxygen is passed through a corona discharge field created by imposing a high voltage electrical potential on a conductive electrode that is disposed in proximity to a dielectric material imposed between the electrode and an electrical ground. Most commonly, dried air is the feedstock to the generator and ozone is created from the oxygen component of the air. Dried gas mixtures containing higher concentrations of oxygen, up to and including pure oxygen, may certainly be used, but the additional cost and complexity of that approach is usually not justified by the higher ozone output that can be achieved. For purposes of this application, the feedstock gas is referred to as air, and it is to be understood that other oxygen containing gas mixtures, or pure oxygen, could be used within the scope of the described invention. The high electrical potential difference allows a corona discharge field to form between the electrode and dielectric. As air is passed through that field, some of the molecular diatomic oxygen ($O_2$) is ionized, and some of the ions recombine in triplets as ozone ($O_3$). Most high capacity ozone generators are of the Kerag type, in which ozone is generated in a plurality of ozone generating cells that are contained within a generator enclosure. Each ozone generating cell comprises, typically, an elongate electrode that is suspended within the interior of, but not in contact with, an elongate hollow dielectric tube, typically of glass or ceramic. In ozone generators of the prior art, the dielectric tubes are supported at their upper, open ends, by a support plate or seal plate, with each dielectric tube extending through an aperture in the plate downward into a container of water. The water is used for cooling as well as being a grounded electrical conductor. In the prior art generators, each electrode is supported at its upper end by an electrode support plate which, like the dielectric tube support plate, is penetrated by a plurality of apertures in which the electrodes are positioned to extend through a lower chamber lying between those two supporting plates. Commonly, each electrode includes a fuse that extends upwardly from the electrode to an electrical contact plate through an upper chamber lying between the electrode support plate and the contact plate. Air is drawn into the upper chamber, into the interior of the electrodes, down the electrodes to their open bottoms, into the space between the electrode and dielectric tubes, up through the corona discharge field to produce ozone, and out the open upper end of the dielectric tubes into the lower chamber, from which the mixed air and ozone is withdrawn for use.

Corona discharge ozone generators of the prior art are effective at producing ozone, and are fairly reliable. However, the ozone generating process is a high energy process, and the high energy corona discharge field maintained within each ozone generating cell can have destructive effects on the generating cell components, requiring generating cell maintenance and occasional replacement. In an ozone generator of the prior art, any maintenance activity that requires access to one or more of the dielectric tubes requires an almost complete disassembly of the generator. An upper closure plate must first be removed, then the electrical contact plate, and then the electrode support plate and all electrodes supported from it, before the upper ends of the dielectric tubes are exposed. During the procedure of removing the electrode support plate and electrodes, and the reverse process of reinstalling them, the risk of damage to electrodes and dielectric tubes is high.

Operational failure of one or more ozone generating cells within an ozone generator of the prior art can also present significant problems in addition to the difficult and time consuming procedure necessary to gain full access to the cells. In the event of a cell failure arising from a dielectric tube fracture, cooling water will immediately enter the tube, electrically short the electrode to ground, and cause the fuse connecting the electrode to the high voltage source to fail. A more significant problem associated with a tube fracture, however, is the potential for flooding of the lower chamber to which all dielectric tubes of the generator open. Water entering that chamber will flood into all dielectric tubes and bring about a catastrophic, cascading failure of all generating cells.

A similar problem can result in the event of a back flow of water from downstream in the treatment system of which the generator is a part. In a back flow situation, water will back up in the conduit carrying ozone to distribution, and into the lower chamber of the ozone generator, to which all dielectric tubes open. Water that enters that chamber will flow into all of the dielectric tubes and precipitate a complete failure of the entire ozone generator system by shorting all of the electrodes.

The problems and increased risk of failure associated with ozone generating systems of the prior art have not been effectively addressed, and contribute to reluctance to utilize ozone in water treatment operations, especially in circumstances in which generator failures can cause extended down time in the functioning of the treatment facility. There remains a need for an ozone generator system that avoids the disadvantages of the prior art and provides a much more reliable source of ozone.

SUMMARY OF THE INVENTION

The present invention provides an ozone generating system that addresses the disadvantages of the prior art and substantially eliminates the risk of complete generator failure related to process upset back flow. In the generating system of the invention all dielectric tubes and electrodes are independently accessible without requiring complete removal of an integrated electrode support and electrical contact plate and all electrodes, and the dielectric tubes are in a manner that minimizes the possibility that failure of a single dielectric tube can precipitate a cascading failure of the entire system. The system of the invention also provides an integrated cooling water level control to prevent flooding, and subsequent failure, of the ozone generator in the event of a downstream process water back flow.

The preferred structure and features of the generator system of the invention will be described below with reference to the accompanying drawing figures.

DESCRIPTION OF THE INVENTION

Figure 3:
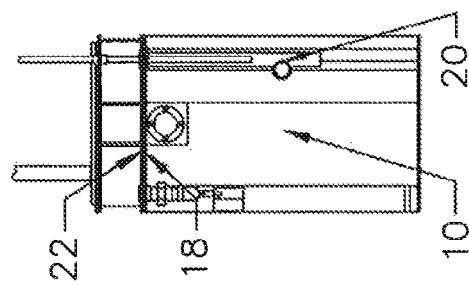
FIG. 3 is a cut-away rear elevation view of the embodiment of FIG. 1.
Figure 4:
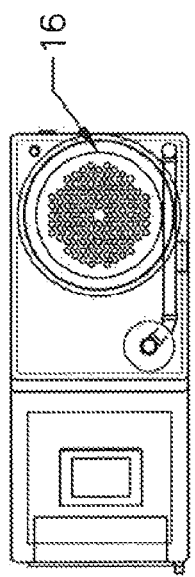
FIG. 4 is a partially cut-away top plan view of the system apparatus as in FIG. 1, illustrating an array of ozone generating cells of the ozone generator component.
Figure 1:
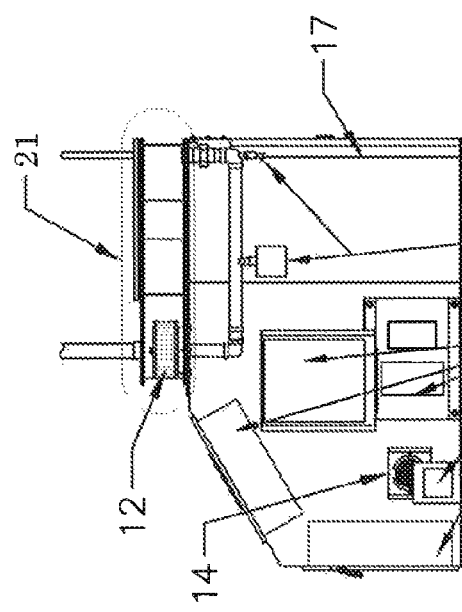
FIG. 1 is a cut-away side elevation view of a preferred embodiment of the apparatus of the ozone generating system of the invention, showing the integration of components in a single enclosure.
Figure 2:
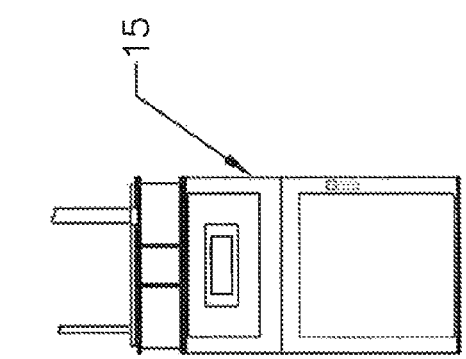
FIG. 2 is a front elevation view of the system enclosure of FIG. 1.
Figure 5:
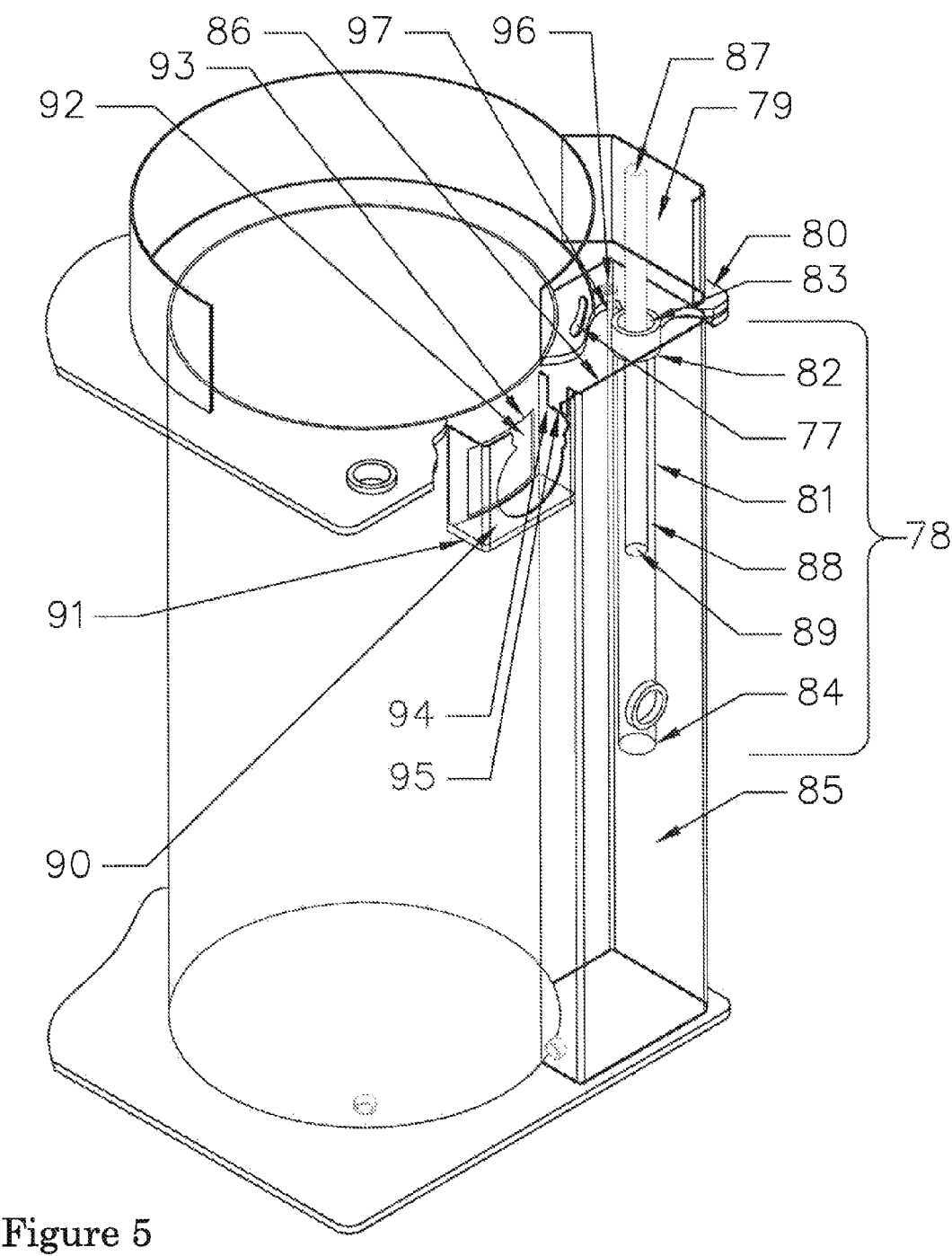
FIG. 5 is a side elevation isometric view of the ozone generator of the invention, with water seal assembly, weir assembly, and pressure relief valve, shown in a full visibility view.
Figure 6:
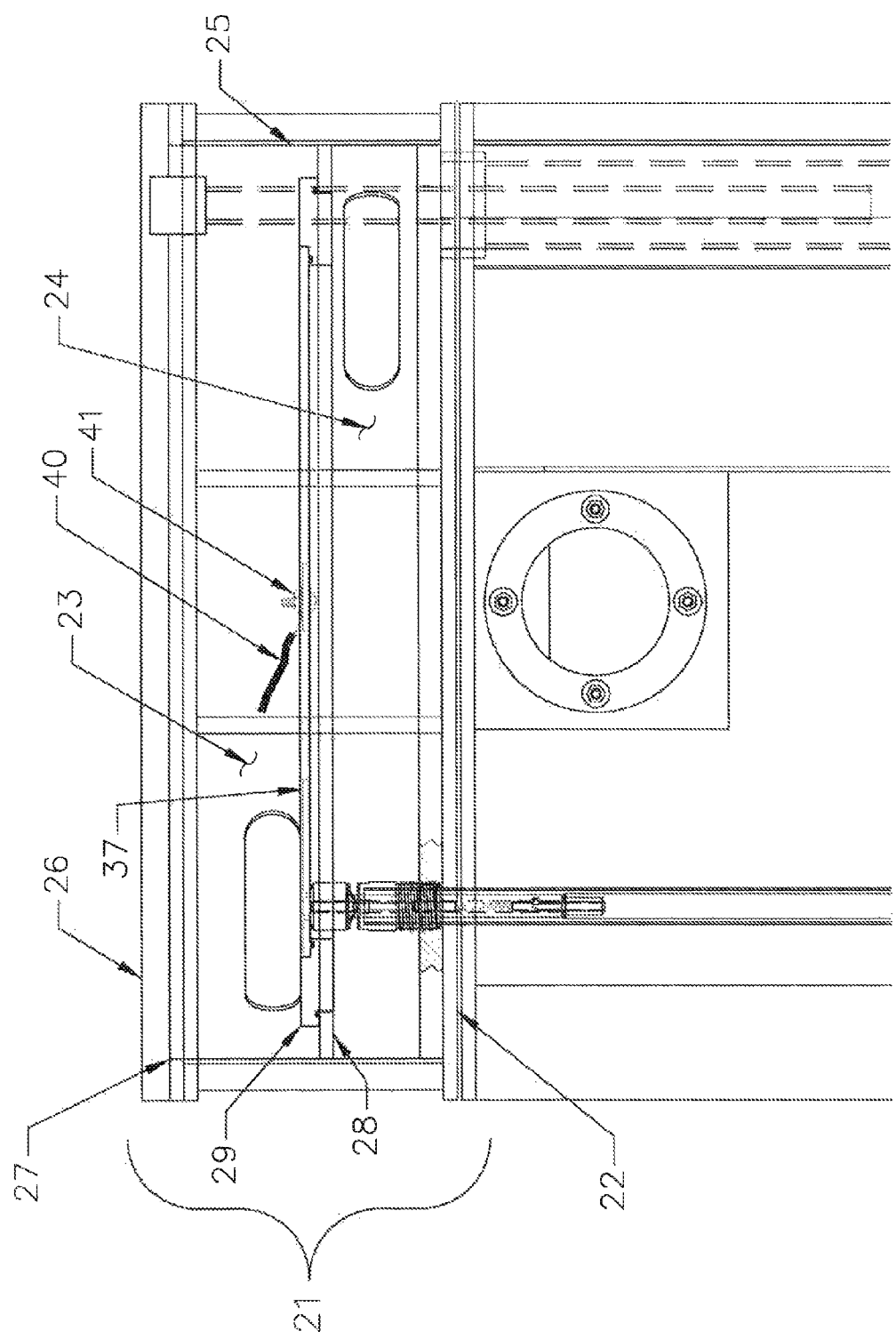
FIG. 6 is a cut-away side elevation view of the upper portion of the preferred embodiment of the ozone generator of the invention and of the head assembly.
Figure 7:
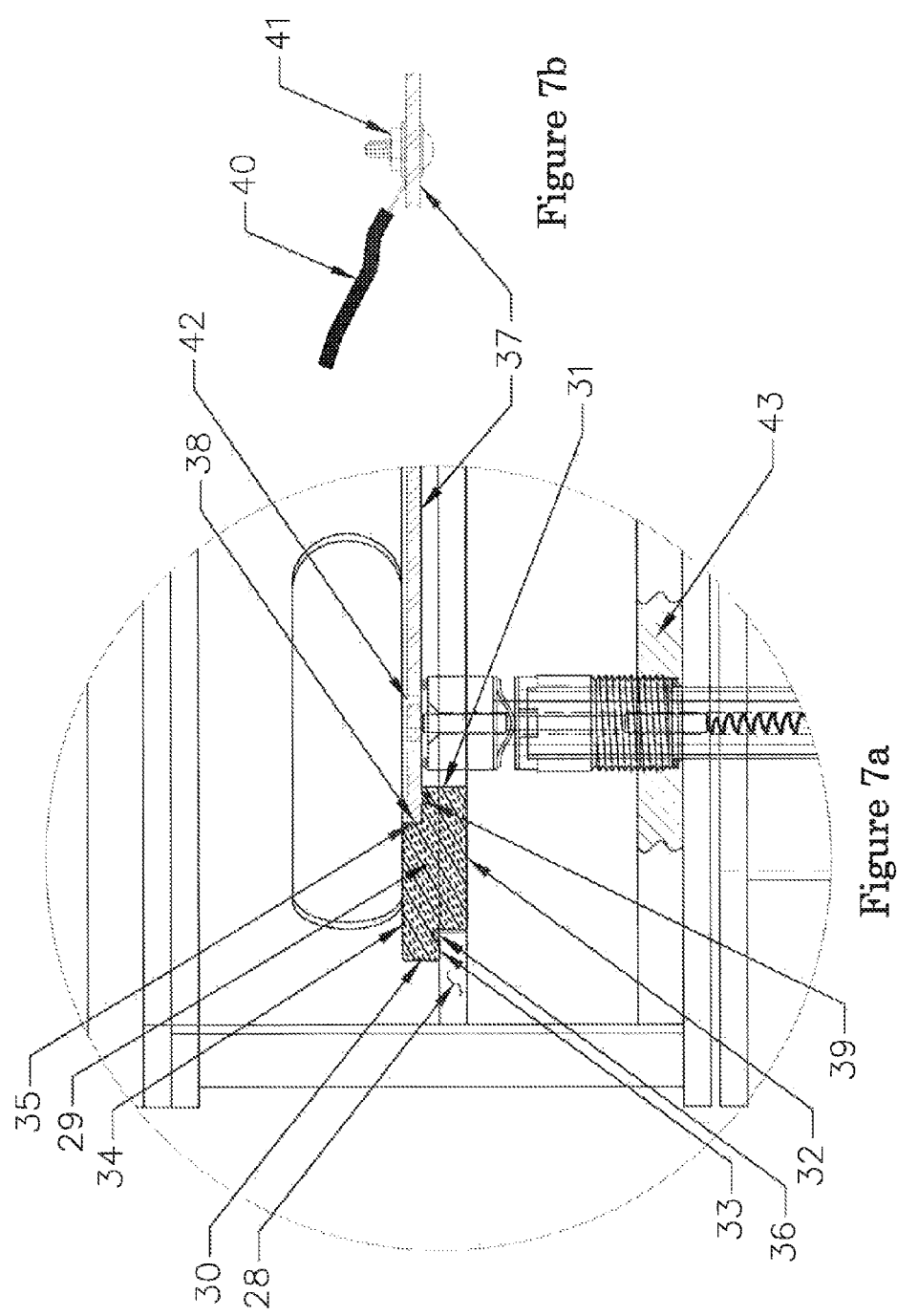
FIGS. 7a and 7b are cut-away side elevation views of a portion of the head assembly as shown in FIG. 6, providing greater detail of the structure of the illustrated components.
Figure 8:
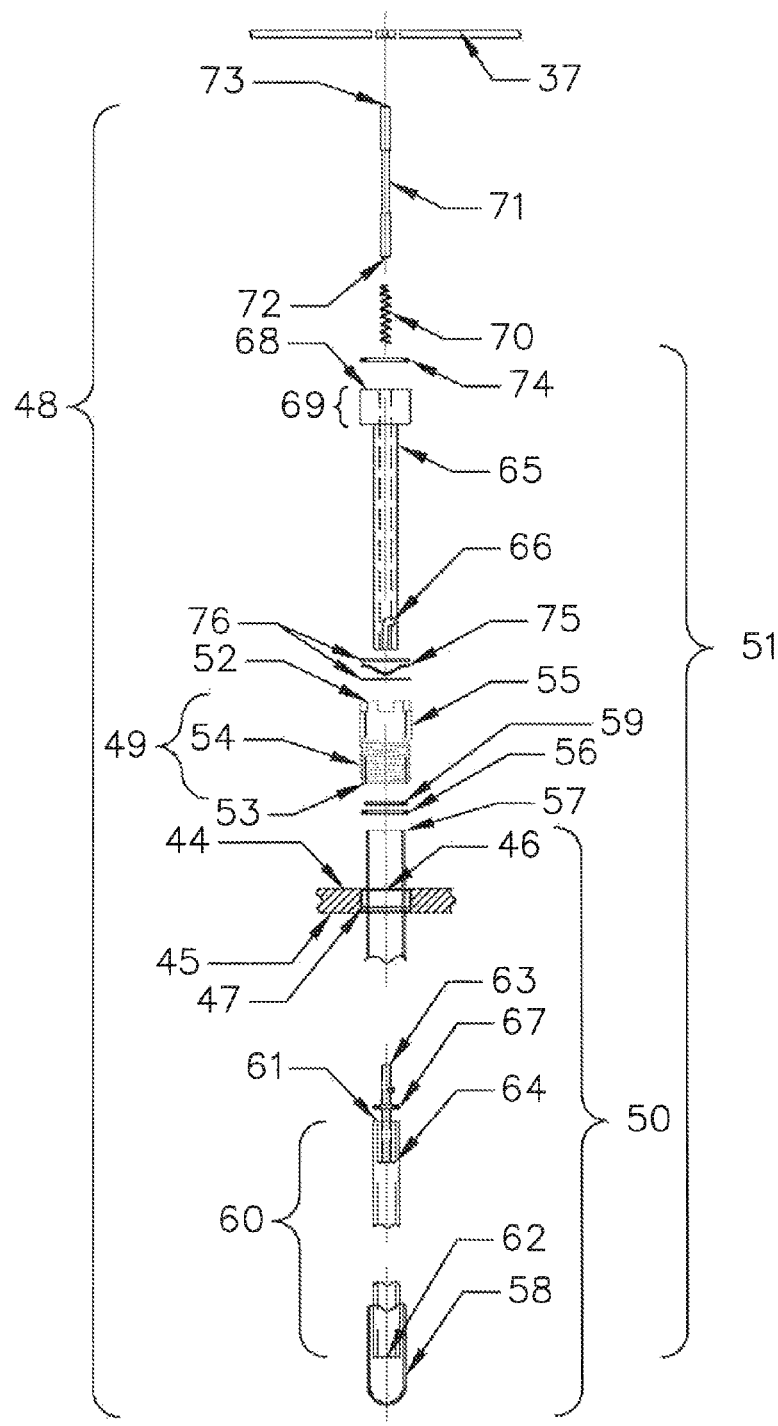
FIG. 8 is a longitudinally separated partial side elevation view of a preferred embodiment of an ozone generating cell, showing details of the electrode assembly.

In its preferred embodiments the ozone generating system of the invention includes an ozone generator assembly 10 that is combined, as a packaged unit, with an incoming air sensor assembly 11, an incoming air filter unit 12, a transformer and electrical power conditioning and control assembly 13, and a cooling fan unit 14, all disposed within an enclosure or cabinet 15 that surrounds and protects the system components while providing easy access to them for inspection, maintenance, and the like.

The principal component in the ozone generating system of the invention is the ozone generator assembly 10, in which ozone is produced by passing dry oxygen or a mix of oxygen with other gases through a corona discharge. Typically, the feedstock gas is dried air, but references to "air" in this description shall be taken to include pure oxygen or another oxygen containing gas mixture. Generator assembly 10 comprises a container body 16, preferably formed as a cylindrical container with a side wall 17, that has an upper edge 18, and a closed bottom 19. A drain aperture 20, which is in indirect liquid flow communication with the interior of the container body, is disposed in the generator assembly at an elevation between the elevation of bottom 19 and the elevation of upper edge 18 of the container body. The generator assembly also includes a head assembly 21, preferably also cylindrical like the container body but of slightly larger diameter, coaxially aligned with the container body so that the lower edge 22 of the head assembly is received against the upper edge 18 of the container body in closely fitting relation as the head assembly is releasably connected to the container body to form a water tight seal. It is contemplated that the upper edge 18 of the container body and lower edge 22 of the head assembly will be formed with mating flanges connected by bolts, and in the drawing figures the reference numbers 18 and 22 identify annular flanges around the top of the container body and the bottom of the head assembly. However, the specific manner of connection of the head assembly to the container body is not a significant feature of the invention, and any effective manner of releasably connecting those components may be used.

Head assembly 21 includes an upper, air chamber 23 and a lower, ozone chamber 24 immediately below the air chamber, both surrounded by a head assembly side wall 25. An upper closure plate 26 extends across the upper edge 27 of the head assembly side wall 25, and is preferably releasably connected thereto, so that the upper closure plate may be removed to provide access to the interior of the head assembly without removing the head assembly from the container body. Again, it is contemplated that upper edge 27 of side wall 25 will be formed as an annular flange to which the outer perimeter of the upper closure plate is connected, but any effective manner of connection may be used. Intermediate the upper and lower edges of side wall 25, an annular ledge 28 extends from the inner surface of side wall 25 inwardly a sufficient distance to provide a stable support for a contact plate support ring 29 at the transition between the upper and lower chambers of the head assembly. Ring 29 is an annular ring with an outer edge 30 at the perimeter of the ring, and an inner edge 31. In the preferred embodiment of ring 29, a notch is formed around the ring at the intersection of edge 30 and the lower surface 32 of the ring, providing a ledge 33 to be received upon ledge 28 so as to suspend the contact plate support ring in the interior of the head assembly. Similarly, a notch is formed at the inner edge 31 of ring 29 at the intersection of that inner edge with ring upper surface 34, providing an annular ledge 35 extending around the inner edge of contact plate support ring 29. Ring 29 is formed of an insulating material, preferably but not limited to ceramic or plastic, to electrically isolate components that are in direct contact with the ring but not in contact with each other. Further, ring 29 is sealed against ledge 28 by, preferably, O-ring gasket 36 extending fully around the intersection between ledge 33 of the ring and ledge 28 of the head assembly to form an air tight and water tight seal. The connection of ring 29 to ledge 28 may be made by any convenient conventional means within the scope of the invention. Ring 29 may be formed as a continuous body, or maybe divided into two or more segments, if desired, within the scope of the invention.

A contact plate 37, configured and dimensioned so that the perimeter edge portion 38 of the contact plate is received on ledge 35 of support ring 29 with the contact plate extending fully across and filling the space surrounded by ring 29. An air tight and water tight seal is formed between ledge 35 and contact plate 37 by an O-ring gasket 39 extending fully around ledge 35. The connection of the contact plate to the support ring may be made by any convenient conventional means, so long as the components remain electrically isolated. The combination of ledge 28, support ring 29, and contact plate 37 defines the bottom of upper chamber 23 of the head assembly and divides the upper chamber from lower chamber 24. Contact plate 37 is formed of an electrically conductive material, preferably stainless steel, and functions to electrically connect electrodes of corona discharge ozone generating cells, described below, to transformer assembly 13 through high voltage lead 40, connected to contact plate 37 by terminal 41.

As an alternative to connecting high voltage lead 40 directly to contact plate 37, contact may be made through an electrical conductor disposed within support ring 29, that makes contact with the contact plate when the contact plate is connected to the support ring. In this embodiment an insulated channel is formed in support ring 29 and an electrical conductor is disposed in and through the channel to one or more electrical contacts within, e.g., ledge 35 formed at the inner edge of ring 29. When the contact plate 37 is received upon ledge 35 and connected to ring 29, an electrical connection between the ring and the contact plate is established. In this embodiment, a conductor establishing contact between ring 29 and the exterior of the head assembly is disposed within an insulated tower that extends from contact with ring 29 through either upper closure plate 26 of the head assembly or through side wall 25 in sealed relation therewith. High voltage lead 40 is connected to the conductor at the outer end of the insulated tower.

To provide a passageway for the flow of air from the upper chamber of the head assembly to ozone generating cells, described below, contact plate 37 is penetrated by a plurality of apertures 42. Apertures 42 are spaced through the central portion of the contact plate inward from the perimeter portion 38 so that none of the apertures penetrate the portion of contact plate 37 that overlies ledge 35 of support ring 29. Apertures 42 are grouped in sets, and the sets of apertures are disposed in a selected pattern across the contact plate.

The lower end of head assembly 21, opposite upper closure plate 26, is closed by seal plate 43, which extends fully across the lower end of the head assembly between side wall 25, adjacent to lower edge 22 of the head assembly, and generally defines the bottom of lower chamber 24 of the head assembly. Seal plate 43 may be removably connected to side wall 25, and/or lower edge 22, may be permanently connected to the sidewall and/or lower edge, or may be integrally formed with lower edge 22 as a blank flange plate that extends fully across the lower end of the head assembly and is connected to the lower end of the side wall. Although convenient, removability of the seal plate is not necessary to provide access to the internal components of the ozone generator of the present invention. The specific structure of upper and lower closures for the generator head assembly is not critical to the invention, and variety of designs in addition to those mentioned above may be used within the scope of the invention.

Seal plate 43 is penetrated between upper face 44 and lower face 45 by a plurality of apertures 46, disposed in a selected pattern across the seal plate. The pattern of disposition of apertures 46 is the same as the pattern of disposition of the sets of apertures 42 in contact plate 37, so that each aperture 46 will be positioned directly below a set of apertures 42 in the final alignment and connection of head assembly components. Each of apertures 46 extends into seal plate 43 from upper face 44 the majority of the distance to lower face 45 at a first diameter, and then narrows to a second, smaller diameter through the remainder of the distance to lower face 45, forming an annular ledge 47 at the transition between the two diameters. The larger diameter portion of each aperture 46 above ledge 47 is threaded.

Ozone generator assembly 10 also includes a plurality of ozone generating cells 48, within each of which a corona discharge is created and ozone is generated from air that is flowing through the corona discharge within the cell. Each generating cell in a typical corona discharge type ozone generator basically comprises an electrode and a dielectric tube within which the electrode is suspended and from which the electrode is electrically separated. When the electrode is connected to a high voltage source, the high potential difference across the dielectric allows the creation of a corona discharge field between the electrode and the dielectric. When dry air or oxygen is passed through the corona discharge field, the incoming oxygen, which is in the $O_2$ molecular form, is ionized and a portion of the ions recombine as $O_3$, known as ozone.

Each generating cell 48 includes as necessary operational components an insert 49, a dielectric tube 50, and an electrode assembly 51. Insert 49 comprises a hollow body, formed of an insulating material, with an open upper end 52 and an open lower end 53. The height of insert 49 between upper and lower ends is less than the height of the lower chamber of the head assembly between contact plate 37 and seal plate 43. The edge of insert 49 at upper end 52 is preferably formed with a plurality of notches or slots extending into the insert from upper end 52, to provide gas outlet passages through the wall of the insert at its upper end. The preferred number of slots is four, but the number may vary within the scope of the invention. Intermediate the upper and lower ends, insert 49 is functionally divided into two portions; a lower, outside threaded cylindrical portion 54 and an upper, preferably non-threaded, portion 55, in which the slots referred to above are formed. In addition to providing passages from the interior of insert 49 to the exterior, the slots formed in portion 55 are designed to be engaged by a insertion and removal tool that is used to rotate the insert around its longitudinal axis. Alternatively, Portion 55 may be formed with a polygonal cross-sectional configuration, to allow that portion of the insert to be engaged by a conventional wrench for insertion and removal, so long as provision is made for the passage of gasses from the interior of insert 49 to the lower chamber of the head assembly. In assembly of the ozone generator, the lower portion of insert 49 is threaded into one of apertures 46 in seal plate 43 from the upper face of the seal plate until the lower end of the insert is received on ledge 47 near the lower face of the seal plate. An O-ring gasket 56 is disposed between the lower end of the insert and the ledge, to form a gas and liquid tight seal.

Each of dielectric tubes 50 comprises an elongate cylindrical tube with an open upper end 57 and a closed lower end 58. It is preferred that tubes 50 be formed of glass, but other dielectric materials, such as a ceramic material, may be used within the scope of the invention. The outside diameter of tube 50, especially at its upper end 57, is slightly less than the inside diameter of the lower portion of the insert 49, so that the upper portion of the tube may be extended fully through aperture 46 without interference, and inserted into the interior of insert 49 through lower end 53. As insert 49 is tightened in aperture 46, O-ring 56 will expand across the space between the outer surface of the dielectric tube and the inner surface of the insert to seal that space as well as sealing between the lower end of insert 49 and ledge 47. In a variation, or alternative approach, a packing ring or sleeve 59 may be disposed between the outer surface of the dielectric tube and the inner surface of the insert, above the lower end of the insert, in addition to O-ring 56. In addition to providing a secondary seal, the use of packing 59 between the tube and insert would also provide at least a mild frictional connection between them.

Electrode assembly 51 comprises an elongate hollow electrically conductive electrode tube 60, preferably metallic, with an open upper end 61 and an open lower end 62. An electrically conductive bayonet tube 63, of smaller diameter than tube 60, extends partially through the upper end 61 into tube 60 in coaxial alignment with the electrode tube. Connection between the bayonet tube and the electrode tube is made by an annular connector 64, which is disposed in, and fills, the space between the outer surface of the bayonet tube and the inner surface of the electrode tube, so that gas flowing down the bayonet tube is allowed to flow into and down the interior of the electrode tube but not through the connection between the bayonet tube and the electrode tube. Annular connector 64 also establishes electrical contact between bayonet tube 63 and electrode tube 60. The upper end of bayonet tube 63, which extends outwardly from connector 64, is received into the interior of electrode insulator 65 through its lower end 66, and is releasably connected therein such that the bayonet tube, plug, and electrode tube are all suspended from and supported by the electrode insulator. An O-ring gasket 67 is disposed around the bayonet tube between the lower end 66 of the electrode insulator and the upper end of electrode tube 60, to seal the connection between them.

Electrode insulator 65 comprises an elongate hollow member with an upper end 68 opposite lower end 66. The portion of insulator 65 adjacent to upper end 68 is formed as a hollow support block 69, which has an outside diameter generally equal to the outside diameter of insert 49. The lower portion of the electrode insulator, from block 69 to lower end 66, is of the same diameter as lower and 66. The configuration and dimensions of electrode insulator 65 allow the lower end 66, with the connected bayonet tube and electrode tube suspended below it, to be inserted through insert 49 and into the interior of dielectric tube 50 until further movement is arrested when support block 69 is received on the upper end of insert 49. In order for an ozone generating cell to operate, an electrical connection must be established between the electrode tube, through the bayonet tube, and a high voltage source. The electrical path is completed by contact spring 70 and fuse 71. Spring 70 is disposed in the interior of electrode insulator 65 with its lower end in contact with bayonet tube 63, and fuse 71 is disposed above spring 70, with the lower end 72 of the fuse in contact with spring 70 and the upper end 73 extending outwardly above support block 69.

In the complete ozone generator of the invention, the number of inserts, dielectric tubes, and electrode assemblies is the same, and is equal to the number of apertures 46 in seal plate 43 and to the number of sets of apertures 42 in contact plate 37. An insert, dielectric tube, and electrode assembly is installed in each aperture 46 as described above. When the contact plate is positioned during assembly of the generator, the outer edges of hollow support blocks 69 are brought into contact with the lower surface of the contact plate around apertures 42 and the upper end of fuse 71 is brought into electrically conductive contact with the contact plate. An O-ring gasket 74 is disposed between the upper end of support block 69 and the lower surface of contact plate 37 to prevent gas flow from apertures 42 into the lower head assembly chamber 24. To accommodate any dimensional variations and to assure that the electrode insulator and O-ring 74 remain firmly seated against the contact plate, a wave spring 75 is disposed between the upper end of insert 49 and the lower end of support block 69, with a washer 76 between the wave spring and the surface against which the spring force is applied.

In an assembled unit of the generator of the invention, dielectric tubes 50, connected to seal plate 43 with inserts 49, extend into the interior of the container base where they are surrounded by cooling water. The lower ends 58 of tubes 50 may be received upon a supporting structure or pad near the bottom of the container base, or the tubes may be hung freely without support, as desired, within the scope of the invention. The cooling water in the container base absorbs heat created by the corona discharge in the generator cells, and is continuously exchanged during operation of the generator to remove the excess and potentially damaging heat. Heated water from the generator may be circulated in a closed loop with heat exchange to cool the water before returning it to the generator, the water may be discharged and replaced with fresh, cooler water, or a combination of those two approaches may be used. The manner in which cooling water is used within the system of the invention is not significant to the scope of the invention, and will be determined by specific conditions and water availability at each site where the generator system is used.

Electrode assemblies 51, which, like dielectric tubes 50, are suspended by inserts 49 and also supported by seal plate 43, extend from insert 49 downward into the dielectric tubes, and upward through the lower, ozone chamber of the head assembly to make electrical contact with contact plate 37. Contact plate 37, and the components supporting it in the head assembly, separate the upper, air chamber of the generator head assembly from the lower, ozone chamber, and it will be understood that the design of the ozone generator of the invention avoids positioning any of the generator cell components in the upper, air chamber of the head assembly. It is also to be understood, as can be seen from the drawing figures, that insert 49 extends upwardly above seal plate 43 through the majority of the height of the lower, ozone chamber of the head assembly in which it is disposed, and that the ozone containing gas exiting from the generator cell exits through the top of insert 49.

It will be seen and understood that the structure of the ozone generator of the present invention eliminates the need for an electrode support plate that, in prior art devices, divides the upper, air chamber of a head assembly from the lower, ozone chamber of the head assembly, and to which all electrode supports and insulators are connected. In the prior designs the dielectric tubes are supported by a plate, similar to seal plate 43, that closes the bottom of the head assembly, and prior art electrode assemblies are suspended from the additional electrode support plate. The electrode assemblies extend within the dielectric tubes but remain completely physically independent of the tubes as well as electrically isolated from them. In the structure of the ozone generator of the present invention, each generator cell comprises an electrode assembly and dielectric tube assembly that are physically connected but electrically isolated from each other, and each is independent of the other cells. With the prior art designs, it is necessary to remove the electrode support plate and all electrode assemblies, after the contact plate is removed, in order to gain access to any of the dielectric tubes. If the electrode support plate and electrodes are removed together, great care must be used in lifting the support plate and electrodes so that the plate and electrodes are lifted straight up, without rotation, to avoid destroying electrodes and/or dielectric tubes. Alternatively, each electrode in a prior art device may be individually removed from the support plate and lifted from the associated dielectric tube before the electrode support plate is removed to provide access to the dielectric tubes. With the generator of the present invention, however, removal of the contact plate allows each electrode assembly and each dielectric tube assembly to be accessed individually. A single electrode assembly can be easily and quickly replaced by removing that electrode assembly from its dielectric tube, which is accomplished by lifting the electrode insulator and suspended electrode from the dielectric tube, and sliding a replacement electrode assembly into place. Similarly, each dielectric tube can be individually accessed and replaced by removing the electrode assembly from that tube and then unscrewing the insert and suspended tube from the seal plate. A new dielectric tube and insert can be installed just as easily and quickly as the old one was removed. The improved accessibility to the ozone generator components provided by the present invention will very significantly reduce the down time associated with generator maintenance in comparison to the prior art, with directly resulting reductions in labor costs and lost operational time.

In the operation of the system of the invention, produced ozone will be drawn from the generator by the suction created in an ozone distribution unit, which mixes ozone containing gas with, e.g., wastewater, in the course of treatment. The ozone distribution unit develops an inlet suction that reduces the pressure within the ozone generator to below the ambient air pressure external to the generator, and draws air into and through the generator, along with the produced ozone. Dry air is supplied to the system apparatus from an outside source, and is drawn through air filter unit 12 at a controlled flow rate measured by sensor assembly 11, and into the upper chamber of the generator head assembly. In addition to the flow rate sensor, assembly 11 also preferably includes a dew point sensor to monitor the moisture content of the air entering the generator. From the upper chamber the dry air is drawn through apertures 42 in contact plate 37, into and through the hollow interior of electrode insulator 65, and into the interior of electrode tube 60, to which a high voltage electrical potential is applied.

Electrical power requirements of the system of the invention are satisfied by drawing upon a source of electricity outside the boundaries of the system of the invention, and utilizing transformer assembly 13 to create a high voltage potential difference between opposite poles. A power conditioning unit, for smoothing variations and fluctuations in the electrical supply, may be provided between the electrical supply and the transformer assembly if desired or deemed appropriate. One side of the high voltage potential is connected to contact plate 37 through high voltage lead 40, through any intervening conductors, and is separated from ground by the air space between the electrode tubes 60 and dielectric tubes 50 and by the dielectric tube material itself. Ground, relative to the high voltage supply, is established through the generator body and the cooling water in the container body surrounding the dielectric tubes. The high potential difference that exists across the gap between and along the surfaces of the tubular electrode and the dielectric tube creates a corona discharge within the gap.

Air drawn into the generator cell is drawn down the interior of the tubular electrode and back up the dielectric tube between the outside surface of the electrode tube and the inside surface of the dielectric tube, through the corona discharge. As the air passes through the field, diatomic molecular oxygen is split into oxygen atoms and ionized. Some of the oxygen ions recombine in triplets to form ozone, and the remainder recombine into diatomic molecular oxygen. The ozone containing gas is drawn to the top of the dielectric tube, into the lower chamber of the head assembly through the notches or other gaps between the upper end of insert 49 and the lower surface of support block 69 of the electrode insulator, and from the lower chamber of the head assembly through an ozone exit port 77 and through a water seal assembly 78 to the ozone distribution unit.

The use of a water seal in ozone generators is known in the prior art, but in the prior art these assemblies are separate from the ozone generator and may be disposed at some distance from it. In the present invention, water seal assembly 78 is a part of the ozone generator itself, a unique configuration that provides certain advantages and benefits that have not been accomplished by the prior art. In the generator of the invention, ozone containing gas exits from the lower chamber of the head assembly through exit port 77, formed in head assembly side wall 25, and into a plenum 79 that is formed as a part of the head assembly. The specific disposition and configuration of plenum 79 is not critical, but it is preferred that the bottom closure 80 of the plenum be in generally the same plane as seal plate 43. Bottom closure 80 may be integral with seal plate 43, or may be a separate component.

Water seal assembly 78 includes an elongate open ended outer tube 81, that is connected at its upper end 82 to bottom closure 80 of plenum 79, around an aperture 83 that penetrates bottom closure 80. Tube 81 extends downwardly from bottom closure 80 to its lower end 84 within a drain chamber 85 disposed within, or adjacent to and in water flow communication with, generator container body 16. In the preferred embodiment, drain chamber 85 is formed within container body 16, either as an integral part or as a separate component that is connected within the container body. Drain aperture 20 connects directly to the interior of drain chamber 85, rather than to the major portion of the interior of the container body. Drain aperture 20 is disposed and connected to drain chamber 85 above the lower end 84 of outer tube 81, so that when water is added to the drain chamber the lower end of the outer tube will be submerged before the water level reaches the drain aperture and is allowed to exit drain chamber 85 through that aperture. The bottom of drain chamber 85 is closed, either by bottom 19 of the container body if the chamber extends fully to the bottom of the container body, or by a separate bottom closure, so that the only connection between the interior of drain chamber 85 and the interior of the container body is at upper edge 86 of the drain chamber. An ozone tube 87, for conveying ozone containing gas from the ozone generator system, extends from the exterior of the generator head assembly, preferably through the top closure, through plenum 79, and through plenum bottom closure 80 in the interior of and in concentric, coaxial relationship with outer tube 81. Ozone tube 87 is of smaller cross-sectional dimension than outer tube 81, leaving an annular space 88 between the outer surface of the ozone tube 87 and the inner surface of the outer tube 81. Ozone tube 87 extends below bottom closure 80 a shorter distance than outer tube 81, so that the lower, open end 89 of ozone tube 87 is above the lower end 84 of tube 81, and is also above the level of drain aperture 20.

Cooling water is preferably introduced to the interior of the container body through an inlet disposed near container bottom 19, and exits through aperture 20 after flowing from the container body into drain chamber 85. The level of cooling water within the container body 16 is controlled and maintained by weir assembly 90, disposed between the main container body 16 and drain chamber 85, adjacent to upper edge 86 of that chamber. In the preferred embodiment, drain chamber 85, and weir assembly 90, are disposed outside the interior of container body 16 and connected to the outer surface of container body side wall 17. In this embodiment weir assembly 90 includes a hollow weir box 91 with a closed bottom. The top of the weir box will underlie, and be effectively closed by, either flange 18 at the upper edge of the container body side wall, or flange 22, at the lower edge of the head assembly side wall, depending upon design and construction decisions that are not critical to the scope of the invention. It is preferred that a transparent sight glass be disposed in the weir box to provide a view of the interior of the weir box and the level of the cooling water within the container body, but the sight glass could be omitted if desired. In the preferred embodiment, box 91 is connected to side wall 17 of the container body, around a substantially rectangular aperture 92 in the container body side wall that is open between the interior of the container body and the interior of the weir box. The upper edge 93 of aperture 92 is disposed below the upper edge 18 of side wall 17 a distance slightly greater than the distance across the air space to be maintained between upper edge 18 and the surface of the cooling water in the container body. In the preferred embodiment the distance through that air space is approximately two inches, and the upper edge 93 is disposed approximately one-eighth inch below the cooling water surface, but other dimensions could be used. It will be understood that weir box 91 may be formed in various ways and still accomplish the same function. Box 91 may be formed with two side walls disposed perpendicular to each other, with the outer edge of one side wall and an outer edge of the bottom closure connected to the container body side, and with the outer edge of the other side wall and the other outer edge of the bottom connected to the adjacent wall of the drain chamber. Box 91 may also be formed with three side walls and a bottom, leaving one open side, and connected to side wall 17 by connecting the free edges of the two opposing side walls and the free edge of the bottom to the container body side wall. In a third approach, box 91 may be formed with four connected side walls and a bottom, and connected to sidewall 17 by placing one of the weir box side walls against the container body wall and connecting the two walls to each other. In this alternative structure, an aperture matching aperture 92 is formed in the weir box side wall connected to the container body wall and aligned with aperture 92.

In a design in which the drain chamber is disposed within the container body, weir assembly 90 is also disposed with the container body, and aperture 92 is formed in one of the side walls of weir box 91 rather than in side wall 17 of the container body 16, since in this configuration cooling water enters the weir box without passing through the container body side wall.

In both of these design approaches, weir assembly 90 includes a weir 94, over which water may flow from the interior of the weir box into the interior of the drain chamber. In the illustrated embodiment, weir 94 is formed by cutting a slot in the side wall or walls separating the interior of the weir box from the interior of the drain chamber. In a construction in which the weir box interior and the drain chamber interior are separated by two walls received against and connected to each other, the slot for weir 94 is sealed around the three edges of the slot so as to prevent water from entering any space between those walls. The upper edge 95 of weir 94 is positioned at the elevation at which the level of cooling water in container body 16 is to be maintained, which is slightly above the upper edge of aperture 92. If the space between the surface of the cooling water and the upper edge 18 of the container body side wall is approximately two inches, the upper edge 95 of weir 94 is the same approximately two inches below upper edge 18, and approximately one-eighth inch above the upper edge of aperture 92.

As the container body of the generator is filled with water and the water level reaches the elevation of the lower edge of aperture 92, water will flow through aperture 92 and fill the weir box 91 while the remainder of the container body is filled. When the water level in the weir box reaches the upper edge 95 of weir 94, the water will begin to flow over the weir into drain chamber 85, within which the water level will rise until it reaches the level of drain aperture 20. Any additional water flowing over weir 94 into the drain chamber will drain out through aperture 20. It will be understood that, once drain chamber 85 is filled, the water level in the drain chamber is independent of the water level in container body 16, so that if the cooling water level in the container body is allowed to drop there is no effect on the level of water in the drain chamber, and the flow of air and ozone through the generator may continue until the flow of cooling water is resumed, or until the generator is shut down.

Although ozone generators can operate for extended periods with relatively few operational problems, those of the prior art, especially, can be adversely affected by problems arising from both internal causes and external causes. The two problems of most concern are the internal failure of a generating cell, resulting from or involving fracture of a dielectric tube, and an external problem with an ozone distribution unit that causes a back flow of water into the ozone generator head assembly.

When an ozone generating cell fails, with fracture of the dielectric tube, cooling water is allowed to enter the dielectric tube and short circuits the associated electrode, causing the fuse that connects the electrode to the contact plate to open and removing power from the failed generating cell. Other generating cells that are not affected by the initial failure and electrical short will continue to function and the generator may continue in service if flooding of the generator head assembly can be avoided. If the suction that draws air and ozone through the generator is sufficiently high and the pressure within the lower chamber of the head assembly is sufficiently below the ambient, external pressure, cooling water that enters the fractured dielectric tube will be drawn upward into the lower, ozone, chamber of the head assembly. From that chamber, water may flow into intact dielectric tubes of other generating cells through the ozone exit path, and cause an immediate failure of each such cell. The entry of even a small amount of liquid water or water vapor into a generating cell can cause cell failure, or, even if the dielectric tube does not fail, will cause a significant reduction in ozone production and a significant increase in the creation of very undesirable nitrogen oxides and acids.

The generator of the present invention addresses this problem in several ways. In the preferred manner of operation of the generator of the invention, the pressure differential between the interior of the lower chamber of the head assembly and the atmosphere around the generator is relatively low. A pressure differential of about two inches of water is preferred, though other values could be used. The selected pressure differential will be sufficient to maintain the flow of air/oxygen and ozone through the generator for effective operation of the generator, and to supply ozone to meet downstream processing needs, without being sufficiently high to draw water into the head assembly of the generator of the invention. In the generator of the invention, the level of the cooling water in the base container is maintained at a distance below the bottom of the seal plate of the head assembly, and the ozone outlet of each insert connected to the seal plate is disposed relatively high above the seal plate and near the contact plate that divides the lower chamber of the head assembly from the upper chamber. In the ozone generator of the invention, the pressure differential with which the generator operates is insufficient to draw cooling water up a dielectric tube over the distance of the gap between the cooling water level and the outlet from the dielectric tube in almost all circumstances, and the entry of water into the lower chamber of the head assembly is very unlikely. Even if water does enter that chamber, it would be necessary for the water to essentially fill the chamber before reaching the level of the ozone outlet from the generating cells and entering the dielectric tubes. As an additional measure to prevent cooling water from being drawn into the head assembly, the generator of the invention further includes a pressure relief valve 96, disposed in an aperture 97 that forms a gas flow passageway between the lower chamber of the head assembly and the water seal drain chamber or the container body below the seal plate. If the pressure differential between the lower chamber of the head assembly and the interior of the container body, which is in communication with and thus at the same pressure as the drain chamber, exceeds the threshold pressure for the pressure relief valve, the valve will open and the pressure differential between the two spaces will be reduced. When the pressure differential is reduced to below the pressure relief valve threshold value, the valve will close. The pressure relief valve will maintain the pressure differential within a selected range that is sufficient to draw gas through the generator, but not so high as to draw cooling water into the lower chamber of the head assembly.

Flooding of the generating cells can also occur in the event of a back flow of water from an ozone distribution unit because of problems downstream from the ozone generator. In ozone generator designs of the prior art, ozone is drawn directly from the lower chamber of the generator head assembly, typically through an outlet port in the side wall of the head assembly, and any back flow of water from downstream enters directly into that chamber. Water under sufficient back flow pressure to enter the generator head assembly will almost certainly flood that chamber and flow, more or less simultaneously, into all dielectric tubes in the generator and precipitate a catastrophic generator failure.

During normal operation of the generator, the suction produced by the downstream ozone distribution unit draws the ozone produced in the generating cells into the lower chamber of the head assembly, through aperture 83 in plenum bottom closure 80 through the interior of outer tube 81, into the lower end of ozone tube 87, and through that tube to the distribution unit. In the event of a downstream upset that forces water to flow back upstream to the ozone generator, the back flow water will enter the generator through ozone tube 87 and be released from the lower end 89 of the ozone tube. If the conduit carrying ozone from the generator were connected directly to the lower chamber of the head assembly, water back flow to the generator would, as noted above, be forced directly into that lower chamber. In the ozone generator of the invention, however, water back flowing from downstream into the integrated generator system will be confined within ozone tube 87 as it passes through the ozone generator head assembly, and none of the water will be released into the head assembly. Instead, the water will be released from the lower end of ozone tube 87 into outer tube 81, from which it flows from the open bottom of tube 81 into drain chamber 85, from which it then exits the generator structure through drain aperture 20. Because water back flowing into the ozone generator passes through the water seal assembly only, and not into any portion of the generator head assembly or container body outside the drain chamber, the only effect on the generator of the invention is a cessation of ozone production. No damage will be done to the ozone generator, and the generator can be returned to service immediately when the downstream problem causing the back flow is corrected, saving both generator repair or replacement cost and processing time that would otherwise be lost. Integration of the water seal structure with the generator in the same enclosure facilitates monitoring and coordinated control of the ozone generator and the protective flow control systems to a degree not available in the prior art.

The foregoing description of the ozone generator system of the invention is intended to be illustrative and not limiting. It is contemplated that others of skill in the art may devise additional alternative embodiments and variations on the basis of that illustrative disclosure, all within the scope of the invention in accordance with the following claims.

The invention claimed is:

1. An apparatus for generating ozone from an oxygen containing gas, comprising, a base container body having a side wall, a bottom closure, and an open top, said container sidewall having an upper edge lying in a plane generally perpendicular to said plane of said bottom closure, said container body having a hollow interior for cooling water, and said container upper edge having container connection means;

a head assembly having a side wall with an upper edge and a lower edge, said assembly upper edge having upper assembly connection means, said assembly lower edge being dimensioned and configured to match the configuration and dimensions of said container upper edge of said container body, said assembly lower edge of said head assembly having lower assembly connection means for connection to said container connection means of said container body;

said head assembly also having an upper closure plate configured and dimensioned to be received upon said assembly upper edge of said head assembly side wall, said upper closure plate having plate connection means for connection to said upper assembly connection means of said head assembly side wall;

said head assembly also having a generally annular ledge extending from the inner surface of said side wall intermediate said assembly upper edge and said assembly lower edge and into the interior of said head assembly;

said head assembly also having a ring support formed of an electrically insulating material, disposed upon said annular ledge in air and water tight relationship therewith;

said head assembly also having a removable contact plate, formed of an electrically conductive material, disposed upon said ring support in air and water tight relation therewith such that an upper chamber is formed within the side wall of said head assembly between said upper closure plate and said contact plate, said contact plate penetrated by a plurality of apertures extending therethrough;

said head assembly also having a lower seal plate connected at said lower edge of said side wall of said head assembly such that a lower chamber is formed within said side wall of said head assembly between said removable contact plate and said seal plate, said seal plate penetrated by a plurality of apertures extending therethrough, the number of said seal plate apertures being equal to the number of said contact plate apertures, with each of said seal plate apertures being coaxially aligned with a distinct one of said contact plate apertures;

a plurality of ozone generating cells, equal in number to the number of said coaxially aligned apertures formed in said removable contact plate and in said seal plate, respectively;

each of said generating cells including suspension means disposed between said removable conductive contact plate and said seal plate in the lower chamber, each said suspension means connected at the lower end thereof to said seal plate in air tight and water tight relation in one of said seal plate apertures and extending the majority of the distance from said seal plate upward toward said contact plate within the lower chamber, and each said suspension means having a hollow interior open at said lower end and open at the upper end;

each of said generating cells including a hollow dielectric tube with an open upper end and a closed lower end, each of said hollow dielectric tubes suspended within one of said suspension means with said hollow dielectric tube extending through said suspension means and supported thereby with said upper end of said dielectric tube within said suspension means and in gas flow communication with the lower chamber;

each of said generating cells also including an electrode assembly, equal in number to the number of said dielectric tubes and to the number of said suspension means, each said electrode assembly having an elongate hollow electrode tube formed of an electrically conductive material, with an open upper end thereof in electrical contact with said conductive contact plate and an open lower end, wherein said electrode tube is disposed within said hollow interior of one of said suspension means and connected dielectric tube with said upper end of said electrode tube in gas flow communication with the upper chamber but not in gas flow communication with the lower chamber, such that a gas flow passageway is established from said upper chamber, through said hollow electrode tube, into the space between said electrode tube and said hollow dielectric tube wherein ozone is generated from the incoming oxygen containing gas, and up said hollow dielectric tube exterior to said electrode tube and into the lower chamber wherein the removal of the removable contact plate permits each of said electrode assemblies to be individually accessed and replaced and the removal of said electrode assembly permits said dielectric tube in which said electrode assembly is disposed to be individually accessed and replaced by withdrawing the suspension means from said seal plate; and wherein said base container includes an inlet for receiving cooling water into the interior of said container body; and said electrode assemblies are within and electrically isolated from said hollow dielectric tubes and said dielectric tubes extend through said seal plate into the interior of said container body where said dielectric tubes are in direct contact with the cooling water for cooling the generator cells and for electrically grounding the apparatus.

2. The apparatus of claim 1, wherein:

the pressure in the lower chamber of said head assembly is maintained at a higher level that the pressure within said container body when the apparatus is operated in a positive pressure mode; and an exit port from the lower chamber is formed in said assembly side wall to permit generated ozone in the lower chamber to exit said head assembly into an ozone tube for conveying ozone out of the ozone generating apparatus.

3. The apparatus of claim 2, wherein said base container body further comprises:

a drain chamber with an open upper end in water flow communication with the interior of said base container body and with a drain aperture near the lower end of the drain chamber for draining water from said drain chamber;

a water seal assembly disposed within said drain chamber, said water seal assembly having an outer tube with an open upper end in fluid communication with said ozone exit port and a closed lower end located below the drain aperture of said drain chamber wherein the diameter of said ozone tube is smaller than the diameter of said outer tube such that said ozone tube is configured concentrically within said outer tube with the lower open end thereof located above the drain aperture of said drain chamber, and generated ozone exiting said head assembly flows into the annular space between the said outer tube and said ozone tube and then flows back up the ozone tube out of the ozone generating apparatus, and in the event back water flows into the ozone tube, the back water flows from said ozone tube into said outer tube, then into said drain chamber, and then out of the apparatus through the drain aperture in said drain chamber, thereby preventing the back water from entering the lower chamber of said head assembly.

4. The apparatus of claim 3, wherein:

the open upper end of said drain chamber configured relative to the upper edge of said container side wall such that an air space is maintained between the upper edge of said container body and the surface of the cooling water in said container body and any excess cooling water from said container body flows into said drain chamber rather than entering said head assembly.

5. The apparatus of claim 4, further comprising a pressure relief valve disposed into an aperture between the lower chamber and said drain chamber to maintain the pressure differential within a range to draw air through the apparatus but not so high as to draw cooling water into the lower chamber of said head assembly.

6. The apparatus of claim 1, wherein each of said suspension means comprises:

an insert having an upper end and a lower end for fitting into one of said apertures in said seal plate;

a hollow electrode insulator having an upper end formed as a hollow support block for seating around one of said apertures in said contact plate and a lower end for insertion through said insert into the interior of said dielectric tube ; and a wave spring disposed between the upper end of said insert and said lower end of said support block for firmly seating said electrode insulator against said contact plate.

* * * * *